United States Patent Office 3,338,859
Patented Aug. 29, 1967

3,338,859
SILICONE POLYIMIDES
Donald E. Green, Midland, Mich., assignor to Dow Corning Corporation, Midland, Mich., a corporation of Michigan
No Drawing. Filed June 30, 1966, Ser. No. 561,702
5 Claims. (Cl. 260—30.2)

ABSTRACT OF THE DISCLOSURE

A film forming silicone polyimide prepared by mixing 45 to 55 mol percent of carbocyclic aromatic carbonyl-containing compounds, having at least 3 carbonyl-containing groups per molecule, such as pyromellitic dianhydride, with 45 to 55 mol percent of

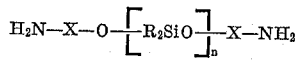

in which $n$ is 3–100 and being free of silicon-halogen bonds, in a polar organic solvent below a temperature of 70° C.

---

This is a continuation-in-part of United States patent application Ser. No. 329,957, filed Dec. 12, 1963, now abandoned.

The present invention relates to new and improved polyimides. More specifically, the present invention relates to silicon polyimides.

Silicones have unique electrical properties as well as excellent thermal stability. Industry is continually searching for improvements in such properties as thermal stability, dielectric strength, flexibility, flexural strength and combinations of these properties.

An object of the present invention is to provide a new polymer with a combination of improved properties; thermal stability, flexibility and electrical properties. The present invention combines the excellent electrical properties of the silicones with the excellent thermal stability of the polyimides.

Other objectives will be apparent from the following detailed description of the present invention.

The present invention relates to a composition of matter consisting essentially of a silicone polyimide prepared by mixing (A) 45 to 55 inclusive mole percent of a carbocyclic aromatic carbonyl-containing compound selected from the group consisting of aromatic anhydrides, aromatic esters, aromatic acids, and combinations of the foregoing having at least three carbonyl-containing groups per molecule selected from the group consisting of —COOH; —COOR″ in which R″ is a monovalent hydrocarbon radical; and

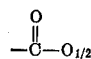

bonded only to another

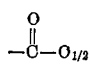

and at least two of the carbonyl-containing groups are in ortho positions, with (B) 45 to 55 inclusive mole percent of the compound of the general formula

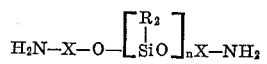

in which each R is a monovalent radical selected from the group consisting of hydrocarbon radicals, halogenohydrocarbon radicals and non-halogenohydrolyzable radicals, each X is a divalent organic radical and $n$ has an average value of from 3 to 100.

The aromatic carbonyl-containing compounds operable in the present invention must contain at least three carbonyl-containing radicals per molecule, preferably four. The term carbonyl-containing radicals is limited in the present invention to organic carbonyl-containing radicals, specifically to include only acids, esters and anhydrides. The aromatic carbonyl-containing compounds are of the general formula

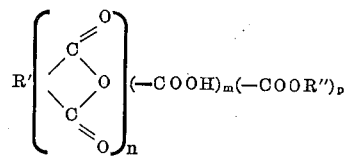

in which R′ is an aromatic radical of three, four, five or six valences, $n$ is an integer from 0 to 3, $m$ is an integer from 0 to 6, $p$ is an integer from 0 to 6, when $n$ is 0, the sum of $m+p$ is an integer from 3 to 6, when $n$ is 1, the sum of $m+p$ is an integer from 1 to 4, when $n$ is 2, the sum of $m+p$ is an integer from 0 to 2, when $n$ is 3, the sum of $m+p$ is 0, and R″ is a monovalent hydrocarbon radical. The monovalent hydrocarbon radical, R″, is not a critical function of the present invention and may be any monovalent alkyl, aryl, cycloalkyl, halogenoalkyl, halogenoaryl and others as defined by R except that the radicals are not linked to silicon atoms but to oxygen atoms to form ester groups. The preferred monovalent hydrocarbon radicals, R″, are alkyl radicals especially those containing from 1 to 10 carbon atoms. The aromatic carbonyl-containing compound must contain at least two carbonyl-containing radicals in the ortho position and preferably two sets of two carbonyl-containing radicals, each set containing two carbonyl-containing radicals in the ortho position. The aromatic carbonyl-containing compound can contain any combination of anhydride, acid or ester groups. The preferred groups in each molecule is two anhydride groups, two acid and two ester groups in which one acid and one ester are always ortho and other similar groupings.

The aromatic radicals can be any of the following basic aromatic nuclei,

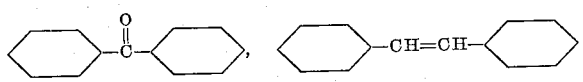
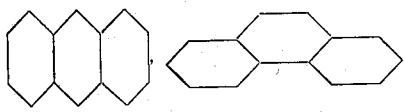
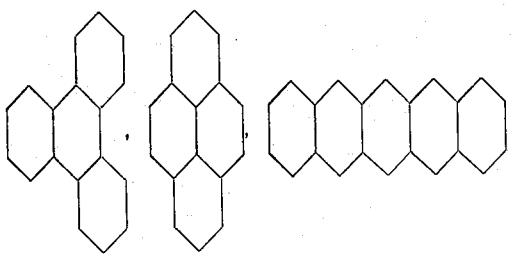
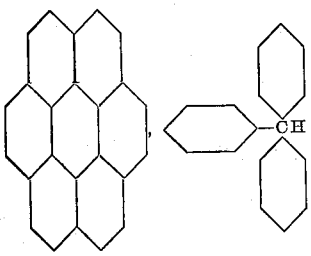
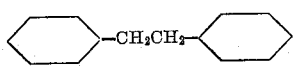
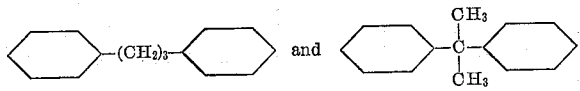

Specific examples illustrative of aromatic anhydrides operative in the present invention include: pyromellitic dianhydride; mellitic anhydride; trimellitic anhydride; 2,3,6,7-naphthalene tetracarboxylic dianhydride; 1,2,5,6-naphthalene tetracarboxylic dianhydride; 3,3′,4,4′-diphenyltetracarboxylic dianhydride; 2,2′,3,3′-diphenyltetracarboxylic dianhydride; 3,3′,4,4′-diphenylmethane tetracarboxylic dianhydride; bis(3,4-dicarboxylphenyl)ether dianhydride; bis(3,4-dicarboxylphenyl)sulfone dianhydride; 3,3′,4,4′-benzophenone tetracarboxylic dianhydride; 3,3′,4,4′-stilbenetetracarboxylic dianhydride; 2,3,6,7-anthracenetetracarboxylic dianhydride; 1,2,7,8-phenanthrenetetracarboxylic dianhydride; 2,3,6,7-naphthacene tetracarboxylic dianhydride; 2,3,8,9-chrysene tetracarboxylic dianhydride; 2,3,6,7-triphenylene tetracarboxylic dianhydride; pyrene-4,5,9,10-tetracarboxylic dianhydride; perylene-3,4,9,10-tetracarboxylic dianhydride; and coronene-1,2,7,8-tetracarboxylic dianhydride. The above aromatic anhydrides are listed to better define the present invention and should not be construed as limiting the invention to these alone.

Specific examples of acids, esters and combinations of acids, esters and anhydrides for use in the present invention are as follows: 2,3-dicarboxylic monoanhydride benzoic acid; 2,3,5,6-tetracarboxylic dianhydride benzoic acid; benzene hexacarboxylic acid; 2,4-diethyl ester of benzene-1,2,4,5-tetracarboxylic acid; 3,3′,4,4′-tetraethyl ester of 3,3′,4,4′-diphenyltetracarboxylic acid; perylene-3,4,9,10-tetracarboxylic acid; and 3,4-monoanhydride of perylene-3,4,9,10-tetracarboxylic acid.

The silicone amines operative in the present invention are of the general formula $$H_2N-X-O-\left[\underset{R_2}{\overset{R_2}{Si}}O\right]_n-X-NH_2$$

in which each R is a monovalent radical selected from the group consisting of hydrocarbon radicals such as methyl, ethyl, butyl, octyl, vinyl, allyl, phenyl, xenyl, xylyl, naphthyl, and tolyl, halogenohydrocarbons such as 3,3,3-trifluoropropyl, monochlorophenyl, monobromophenyl, gammachlorobutyl and dichlorophenyl and hydrolyzable radicals such as methoxy, ethoxy, isopropoxy, butoxy, phenoxyl, hydroxyl, acetate, propionate, benzoate, hydrogen and $-O-N=C(R'')_2$. The silicone amines are free of silicon-halogen bonds. The presence of silicon halogen bonds interfere with the reaction.

The divalent organic radical, X, is a hydrocarbon or substituted hydrocarbon. Specific examples of the divalent organic radical are: alkylenes such as methylene, ethylene, vinylene, propylene, propenylene, butylene, amylene, methylpropylene and hexylene; arylenes such as phenylene, naphthylene, phenanthrylene, anthrylene, indenylene and diphenylene; substituted arylenes such as methylphenylene, chlorophenylene, aminophenylene, methylnaphthylene, tolylene, durylene, ethylphenylene, mesitylene, propylphenylene, and xylylene; aralkylene such as benzylidene, styrene, cinnamylidene, cuminylidene, phenylethylene, phenylpropylene, phenylbutylene, and naphthylethylene; cycloaliphatics such as cyclopropylene, cyclobutylene, cyclopentylene, cyclohexylene, cyclopentylidene, cyclohexylidene and cycloheptylidene; halogenated alkylenes such as tetrafluoroethylene and monobromobutylene; and miscellaneous divalent organic radicals such as $-CH_2CH_2NHCH_2-$, $-CH_2OCH_2CH_2CH_2-$, $-CH_2CH_2-S-CH_2CH_2-$ and $-CH_2CH_2NHCH_2CH_2CH_2-$ The number of $R_2SiO$ groups, $n$, per molecule is from 3 to 100. The most preferred number of $R_2SiO$ groups per molecule is from 3 to 30 inclusive. The amine compound must contain at least 3 of the $R_2SiO$ groups and the amine functional group must be attached to the silicon atom through an oxygen atom.

The organic polyimides form a very rigid structure and any amount of flexibility which is obtained, is derived from the very long chains of the organic polyimides. These high molecular organic polyimides have very low solubility in polar organic solvents and for all practical purposes are insoluble in non-polar organic solvents. The silicone polyimides of this invention solve both these problems. The silicone portion of the diamine in the present invention overcomes the flexibility and solubility problems. When $n$ is at least 3, the silicon-oxygen linkages in the diamine provide flexibility to the silicone polyimide because the silicon atoms are free to rotate around the oxygen atoms with sufficient freedom to permit bending of the silicone polyimide chain. When there is less than 3 siloxane units in the diamine, the rest of the polyimide chain holds the silicon-oxygen linkages relatively rigid and thus no practical increase in flexibility is observed. Increasing the value of $n$ above 3 increases the flexibility. The solubility is not increased for all practical purposes until $n$ is at least 3. As $n$ increases above 3, the solubility takes on the solubility characteristics of the silicone portion which is soluble in non-polar organic solvents. The present invention must therefore have $n$ equal to at least 3 and can have a maximum of 100. When the value of $n$ exceeds 100, the properties of the imide are sufficiently masked to warrant making this type of polymer.

The silicone amine is prepared by any conventional method. One preferred method produces the silicone amine by trans-esterification such as

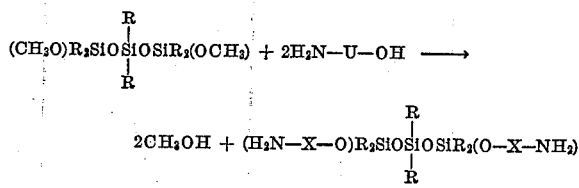

in the presence of tetraisopropyltitanate and enough heat to carry the methanol from the reaction mass. Specific examples of amines used in the above reaction are β-aminoethanol, aminopropanol, 3-aminobutanol, 4-aminobutanol, 5-aminopentanol, 6-aminohexanol, 10-aminodecanol, aminophenol, diaminophenol, 4-aminocyclohexanol, aminocresol, p-aminophenylethanol, p-aminophenylmethylcarbinol, aminonaphthanol, diaminonaphthanol, and ammeline. Many other amine-alcohol compounds can be used in the present invention for the preparation of the silicone amine such as those containing the divalent organic radicals described above. The preferred silicone amine is the diamine.

Some specific examples of the silicone diamines are:

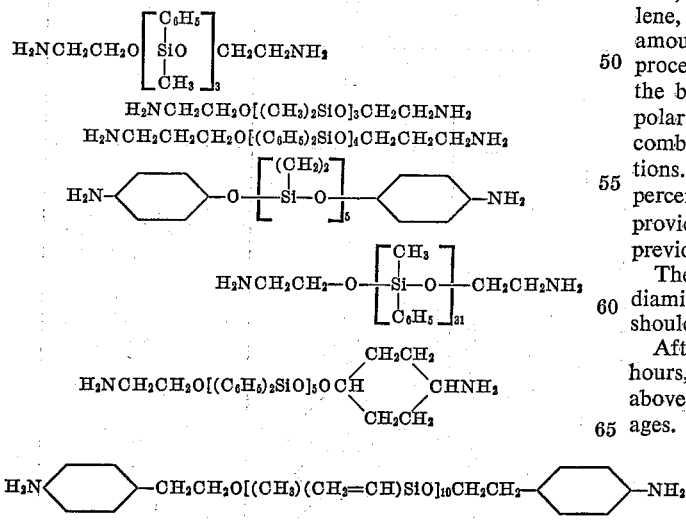

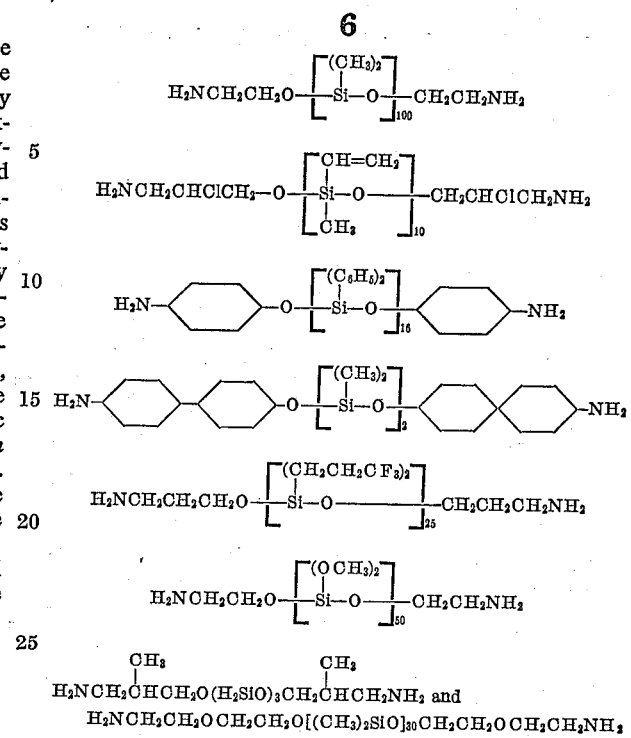

The silicone diamine is dissolved in a suitable polar organic solvent and then the aromatic carbonyl-containing compound is slowly added while the solution is continuously agitated. The polar organic solvent which is suitable for the present invention can be one polar organic solvent, a mixture of polar organic solvents, or one or more polar organic solvents with nonpolar organic solvents. Specific examples of suitable polar organic solvents are: N,N-dimethylformamide; N,N-diethylacetamide; N,N-dimethylmethoxyacetamide; dimethylsulfoxide; N-methyl-2-pyrrolidone, pyridone; dimethylsulfone; hexamethylphosphoramide; tetramethylene sulfone and dimethyltetramethylene sulfone. The critical feature of the solvent is that it be polar and non-reactive with any of the reactants. Combinations of the above solvents with less polar and less expensive solvents are particularly advantageous. Examples of such solvents are benzene, benzonitrile, dioxane, β-ethoxyethyl acetate, butyrolactone, xylene, toluene and cyclohexane. Water beyond trace amounts in the system cannot be tolerated. The entire process should be as moisture free as possible to produce the best results. Where combinations of polar and nonpolar organic solvents are used any amounts and any combinations can be used which produce soluble solutions. The final solution can be from 10 to 80 weight percent solids. The polyimide of the present invention provides solutions having high solids concentrations not previously obtainable.

The temperature of the reaction between the silicone diamine and the aromatic carbonyl-containing compound should be below 70° C., preferably below 60° C.

After the reaction has continued for 15 minutes to 10 hours, the temperature is raised above 60° C., preferably above 70° C. to convert the amide linkages to imide linkages. Conversion is at no time absolutely complete but there should be at least 50% conversion of amide to imide linkages to produce the best results.

The silicone polyimide is cured by heating to from 100° to 250° C. and for improving the cure, short intervals at temperatures from 300° to 500° C. are helpful.

The silicone polyimide is film forming, is flexible, has good electrical properties and has good thermal properties. The flexibility and solubility in non-polar organic solvents increase with an increasing value of $n$.

The final silicone polyimide is believed to be of the following structure; using pyromellitic dianhydride as the aromatic carbonyl-containing compound for illustrative purposes:

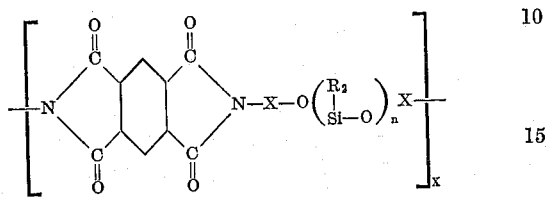

The average number of units, $x$ in the polymer varies before cure from a low value of 5 to a very large value of 1,000,000.

The molar ratio of the silicone diamine to the aromatic carbonyl-containing compound should be approximately 1:1. Up to a 5 mol percent excess of either of the ingredients is not detrimental to this invention.

The following examples are illustrative only and should not be construed as limiting the invention which is properly delineated in the appended claims.

Preparation of silicone amine intermediates:

PREPARATION A

The silicone amine can be prepared in any conventional manner. In this example, 100.0 g. of

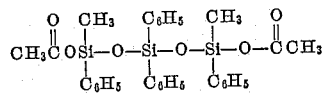

and 21.5 g. of ethanolamine were mixed at room temperature with 0.1% of tetraisopropyltitanate. The reaction was exothermic. The mixture was vacuum stripped and a high viscosity fluid was obtained. Upon standing the fluid solidified into a crystalline solid. The product obtained was

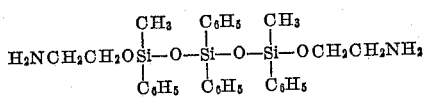

Example 1

30.0 g. of the product of Preparation A was diluted with 41.5 g. of N,N-dimethylformamide and to this solution 11.5 g. of pyromellitic dianhydride was slowly added. The temperature increased to 60° C. during the addition. The addition of the pyromellitic dianhydride was complete in 10 minutes. Agitation was continued for 20 minutes during which the temperature dropped to room temperature. The final solution was clear and compatible. The solution was 45.1% solids with a viscosity of 68 centipoise at 25° C. and a specific gravity of 1.017.

Example 2

When the product of Example 1 is heated to 200° C., a film of silicone polyimide is deposited.

Example 3

When the following materials react according to the procedure of Example 1, similar products are formed. The solution can be heated in each case above 60° C. to permit the partial conversion of the amide linkages to imide linkages.

| | A Aromatic Carbonyl Compound | Moles A | B Silicone Diamine | Moles B | Solvent | Solvent ratio |
|---|---|---|---|---|---|---|
| 3 | (biphenyl dianhydride structure) | 1.05 | $H_2N-CH=CH-O-\left[\begin{array}{c}(CH_2)_3CH_3\\ -Si-O-\\ C_6H_5\end{array}\right]_8 CH=CHNH_2$ | 1.00 | Dimethylsulfoxide | 100 |
| 4 | (pyromellitic dianhydride + diphenyl ether dianhydride) | 0.7, 0.3 | $H_2NCH\left[\begin{array}{c}CH_2CH_2\\CH_2CH_3\end{array}\right]\left[\begin{array}{c}H\\ -Si-O-\\ CH_3\end{array}\right]_{30}\left[\begin{array}{c}CHO\\CH_2CH_2\end{array}\right]CHNH_2\left[\begin{array}{c}CH_2CH_2\\CH_2CH_2\end{array}\right]$ | 1.00 | N,N-dimethylformamide, xylene | 70:30 |
| 5 | $\begin{array}{c}CH_3OOC-\underset{HOOC-}{}-COOCH_3\\-COOH\end{array}$ | 1.00 | $H_2N(CH_2)_4O[CH_3(CF_3CH_2CH_2)SiO]_{100}(CH_2)_4NH_2$ | 1.00 | N-methyl-2-pyrrolidone | 100 |
| 6 | (bisphenol-A type dianhydride with two $CH_3$) | 1.00 | $\begin{array}{c}Cl\\H_2N-\phantom{X}-\phantom{X}-O-\left[\begin{array}{c}(OC_4H_9)_2\\-Si-O-\end{array}\right]_3-\phantom{X}-NH_2\\Cl\end{array}$ | 1.05 | Dimethylsulfone, Cellosolve acetate | 60:40 |
| 7 | (cyclic dianhydride) | 1.00 | $H_2NCF_2CF_2O\left[\begin{array}{c}CH_3\\ -Si-O-\\ CH_3\end{array}\right]_{100} CF_2CF_2NH_2$ | 1.00 | N,N-dimethylformamide, toluene | 40:60 |
| 8 | (tetracyclic tetracarboxylic compound, COOH groups) | 1.00 | $H_2N-\phantom{X}-\phantom{X}-\phantom{X}-O-\left[\begin{array}{c}CH_3\\ -Si-O-\\ CH_3\end{array}\right]_{15}-\phantom{X}-\phantom{X}-\phantom{X}-NH_2$ | 1.00 | N,N-dimethylformamide | 100 |

That which is claimed is:

1. A composition of matter consisting essentially of a silicone polyimide prepared by mixing
   (A) 45 to 55 inclusive mol percent of carbocyclic aromatic carbonyl-containing compound selected from the group consisting of aromatic anhydrides, aromatic esters, aromatic acids and combinations of the foregoing having at least three carbonyl-containing groups per molecule selected from the group consisting of —COOH; —COOR″ in which R″ is a monovalent hydrocarbon radical; and

bonded only to another

and at least two of the carbonyl-containing groups are in the ortho positions, with
   (B) 45 to 55 inclusive mole percent of a compound of the general formula

in which each R is a monovalent radical selected from the group consisting of hydrocarbon radicals, halogenohydrocarbon radicals and hydrolyzable radicals, each X is a divalent organic radical selected from the group consisting of alkylene radicals, arylene radicals, substituted arylene radicals, aralkylene radicals, cycloaliphatic radicals, halogenated alkylene radicals, —CH₂CH₂NHCH₂—, —CH₂OCH₂CH₂CH₂—
   —CH₂CH₂—S—CH₂CH₂— and
   —CH₂CH₂NHCH₂CH₂CH₂— and $n$ has an average value from 3 to 100, and said compound is free of silicon-halogen bonds, in a polar organic solvent below a temperature of 70° C.

2. The composition of matter according to claim 1 wherein $n$ has an average value from 3 to 30 and (A) and (B) are reacted at a temperature below 60° C.

3. The composition of matter according to claim 1 wherein the polar organic solvent is selected from the group consisting of polar organic solvents and mixtures of polar organic solvents and non-polar organic solvents, such that the solids concentration of the final product is from 10 to 80 percent by weight, externally cooling the mixture such that the reaction temperature is below 70° C., raising the temperature above 70° C. for partial conversion of the amide linkages to imide linkages after the reaction is complete.

4. The composition of claim 3 wherein (A) is pyromellitic dianhydride.

5. The composition of claim 3 wherein
   (A) is pyromellitic dianhydride and
   (B) is

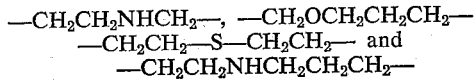

References Cited

UNITED STATES PATENTS

| | | | |
|---|---|---|---|
| 3,179,631 | 4/1965 | Endrey | 260—46.5 |
| 3,179,634 | 4/1965 | Edwards | 260—46.5 |
| 3,274,155 | 9/1966 | Saunders et al. | 260—46.5 |

FOREIGN PATENTS 6,414,419   6/1965   Netherlands.

DONALD E. CZAJA, *Primary Examiner.*

M. I. MARQUIS, *Assistant Examiner.*